(12) United States Patent
Matsuoka (10) Patent No.: US 9,409,317 B2
(45) Date of Patent: Aug. 9, 2016

(54) MANUFACTURING METHOD OF BAG BODY

(71) Applicant: Hirofumi Matsuoka, Nagoya (JP)

(72) Inventor: Hirofumi Matsuoka, Nagoya (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 216 days.

(21) Appl. No.: 14/372,303

(22) PCT Filed: Jan. 14, 2013

(86) PCT No.: PCT/IB2013/000042
§ 371 (c)(1),
(2) Date: Jul. 15, 2014

(87) PCT Pub. No.: WO2013/108106
PCT Pub. Date: Jul. 25, 2013

(65) Prior Publication Data
US 2014/0374942 A1    Dec. 25, 2014

(30) Foreign Application Priority Data

Jan. 16, 2012  (JP) .................................. 2012-005972

(51) Int. Cl.
| | |
|---|---|
| *B29C 45/44* | (2006.01) |
| *B29C 41/14* | (2006.01) |
| *B25J 15/00* | (2006.01) |
| *B29B 11/02* | (2006.01) |
| *B29D 22/00* | (2006.01) |
| *B29K 21/00* | (2006.01) |

(52) U.S. Cl.
CPC ............ *B29B 11/02* (2013.01); *B25J 15/0023* (2013.01); *B29C 45/4457* (2013.01); *B29D 22/003* (2013.01); *B29C 41/14* (2013.01); *B29K 2021/00* (2013.01); *B29K 2995/0046* (2013.01); *B29K 2995/0067* (2013.01)

(58) Field of Classification Search
None
See application file for complete search history.

(56) References Cited

U.S. PATENT DOCUMENTS 5,516,477 A * 5/1996 Johnson ................ B29C 33/448
249/134
2013/0033050 A1    2/2013 Matsuoka et al.

FOREIGN PATENT DOCUMENTS

| FR | 588657 A | 5/1925 |
|---|---|---|
| GB | 621046 A | 4/1949 |
| JP | 58-020430 A | 2/1983 |
| JP | 61-254309 A | 11/1986 |
| JP | 62-117707 A | 5/1987 |
| JP | 2005-054490 A | 3/2005 |
| JP | 2008-273604 A | 11/2008 |
| JP | 2011-230260 A | 11/2011 |
| WO | 93/25365 A1 | 12/1993 |
| WO | 2011/135450 A1 | 11/2011 |

* cited by examiner

*Primary Examiner* — Mary F Theisen
(74) *Attorney, Agent, or Firm* — Kenyon & Kenyon LLP (57) ABSTRACT

A manufacturing method of a bag body that has a bag-shaped member made of an elastic and airtight material, and a granular substance filled inside of the bag-shaped member, includes a step of preparing a core for forming the bag-shaped member, by hardening the granular substance; a step of forming the bag-shaped member by forming a covering made of the elastic and airtight material around the core; and a step of breaking up the core that is inside of the bag-shaped member.

9 Claims, 12 Drawing Sheets

MANUFACTURING METHOD OF BAG BODY

CROSS-REFERENCE TO RELATED APPLICATIONS

This is a national phase application based on the PCT International Patent Application No. PCT/IB2013/000042 filed Jan. 14, 2013, claiming priority to Japanese patent application No. 2012-005972 filed Jan. 16, 2012, the entire contents of both of which are incorporated herein by reference.

BACKGROUND OF THE INVENTION

1. Field of the Invention

The invention relates to a manufacturing method of a bag body, for example a contact portion that is a member that forms a tip portion of a grasping apparatus, and that is formed by filling a granulated substance into a bag-shaped member. A case is described below in which the bag body is applied to a contact portion that is a member that forms a tip portion of a grasping apparatus. However, the range of application of the bag body is not limited thereto.

2. Description of Related Art

A grasping apparatus for grasping a workpiece is developed that can reliably grasp workpieces of various shapes without replacing a tip portion or the like. Also, in this type of grasping apparatus, a reliable grasping state is able to be ensured by deforming a contact portion that is a portion that directly contacts the workpiece so that it conforms to the shape of the workpiece. The contact portion is able to take on two opposite forms, i.e., one in which the shape of the contact portion is able to flexibly deform and another in which the shape of the contact portion is firmly maintained, with a single member.

The contact portion provided with this kind of grasping apparatus that is used is such that a granular substance such as synthetic mullite is filled inside of a bag-shaped member made of rubber. Also, Japanese Patent Application Publication No. 2005-54490 (JP 2005-54490 A), for example, describes technology related to a manufacturing method of a bag-shaped member made of rubber.

The bag-shaped member made of rubber that is used for the contact portion of the grasping apparatus is used with the inside evacuated, so in order to be able to reliably ensure a vacuum, an open portion for providing a cap or the like may be made as small as possible. In order to manufacture a bag body for a contact portion having such a small open portion, manufacturing is typically performed by a method that involves vulcanize-bonding using a press apparatus or the like as described in JP 2005-54490 A. With this kind of manufacturing method, the finishing work and the like of the bag-shaped member must be performed manually by a skilled worker, so the manufacturing cost of the bag-shaped member and the contact portion that is formed using this bag-shaped member increases, and mass production is difficult. Also, in order to use the rubber bag-shaped member that is manufactured according to the technology described in JP 2005-54490 A as a contact portion, a step of filling a granular substance of synthetic mullite or the like into the bag-shaped member must be provided separately.

SUMMARY OF THE INVENTION

The invention thus provides a manufacturing method of a bag body that makes it possible to easily manufacture a contact portion that forms a tip portion of a grasping apparatus.

That is, one aspect of the invention relates to a manufacturing method of a bag body that has a bag-shaped member made of an elastic and airtight material, and a granular substance filled inside of the bag-shaped member. This manufacturing method includes a step of preparing a core for forming the bag-shaped member, by hardening the granular substance, a step of forming the bag-shaped member by forming a covering made of the elastic and airtight material around the core, and a step of breaking up the core that is inside of the bag-shaped member.

According to this aspect, the bag body is able to be easily manufactured without providing a separate step for filling the granular substance into the bag-shaped member.

In the aspect described above, the step of preparing the core may be performed by molding a mixture that includes the granular substance and a solid that has a predetermined volume, and that sublimes as a binder into a predetermined shape by compressing the mixture inside of a mold.

In the aspect described above, the step of preparing the core may be performed by molding a mixture that includes the granular substance and a binder into a predetermined shape by heating the mixture inside of a mold.

In the aspect described above, the step of preparing the core may be performed by molding a mixture that includes the granular substance and a liquid as a binder into a predetermined shape by solidifying the liquid by cooling the mixture inside of a mold.

Accordingly, it is easy to manufacture a core that is a core for forming the bag-shaped member, and that includes the granular substance.

In the aspect described above, the step of breaking up the core may be performed by subliming the solid having the predetermined volume that forms the core that is inside of the bag-shaped member, by heating the bag-shaped member or leaving the bag-shaped member.

In the aspect described above, the step of breaking up the core may be performed by pulverizing the core that is inside of the bag-shaped member, by applying external force to the bag-shaped member.

In the aspect described above, the step of breaking up the core may be performed by dissolving the binder that forms the core that is inside of the bag-shaped member, by pouring water into the bag-shaped member.

In the aspect described above, the step of breaking up the core may be performed by dissolving the solidified liquid that forms the core that is inside of the bag-shaped member, by heating the bag-shaped member or leaving the bag-shaped member.

Accordingly, it is easy to break up the core inside of the bag-shaped member. As a result, the granular substance is able to be easily granularized inside the bag-shaped member.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
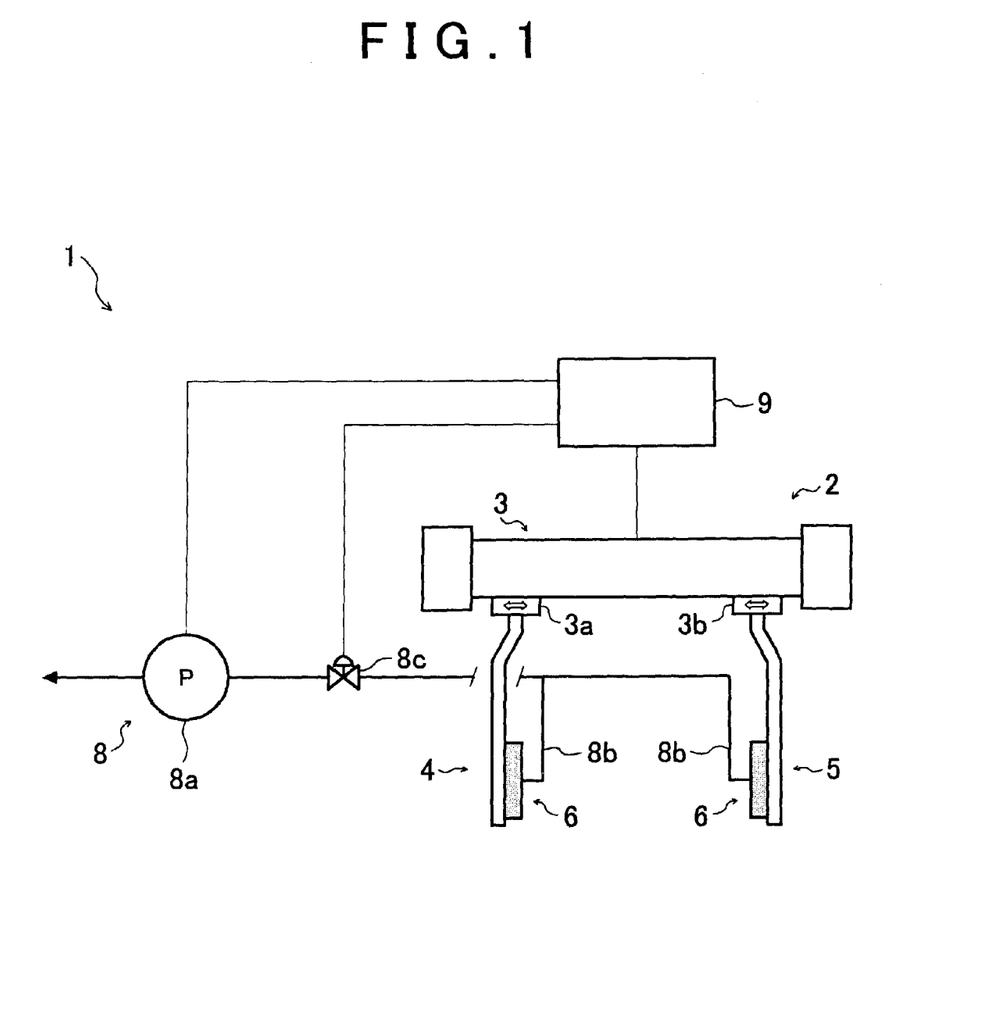
FIG. 1 is a view showing a frame format of the overall structure of a grasping apparatus having a contact portion bag body (i.e., a bag body for a contact portion) manufactured by a manufacturing method according to example embodiments of the invention.

Next, example embodiments of the invention will be described. First, the overall structure of a grasping apparatus having a bag body for a contact portion manufactured by a manufacturing method according to the example embodiments of the invention will be described with reference to FIGS. 1 to 3. As shown in FIG. 1, a grasping apparatus 1 according to a first example embodiment of the invention is an apparatus for grasping and holding a workpiece or the like, and includes a grasping portion 2, evacuation equipment 8, and a control device 9 and the like.

The grasping portion 2 is a portion of the grasping apparatus 1 that directly grasps the workpiece, and includes a driving portion 3, a plurality of pawl portions 4 and 5, and a plurality of contact portions 6 and the like.

As shown in FIGS. 1, and 2A, 2B, and 2C, the driving portion 3 is an apparatus that is provided with slider portions 3a and 3b of two systems, and is able to reciprocally displace each of these slider portions 3a and 3b, either independently or in left-right conjunction, with respect to the same axial direction. An electric actuator or the like that is provided with a reciprocating mechanism formed by a ball screw and nut and a motor or the like may be used as the driving portion 3, for example.

The pawl portions 4 and 5 are a pair of portions provided for clamping the workpiece. That is, the pawl portions 4 and 5 are portions that clamp and hold a workpiece arranged in a position between them. The shapes of the pawl portions 4 and 5 are set taking into account the shape and size of the workpiece to be grasped, and the stroke amount of the slider portions 3a and 3b and the like.

Figure 2A:
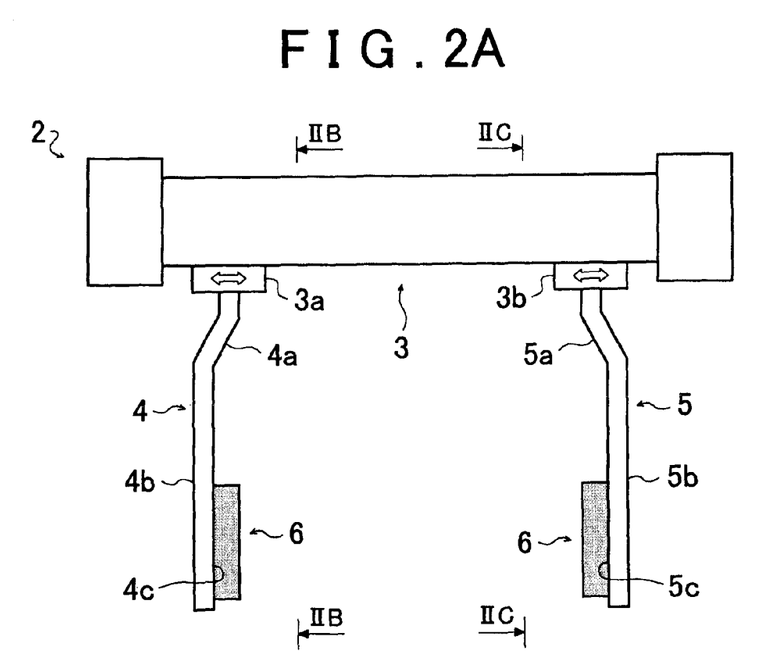
FIG. 2A is a view showing a grasping portion of the grasping apparatus having the contact portion bag body manufactured by the manufacturing method according to the example embodiments of the invention.
Figure 2B:
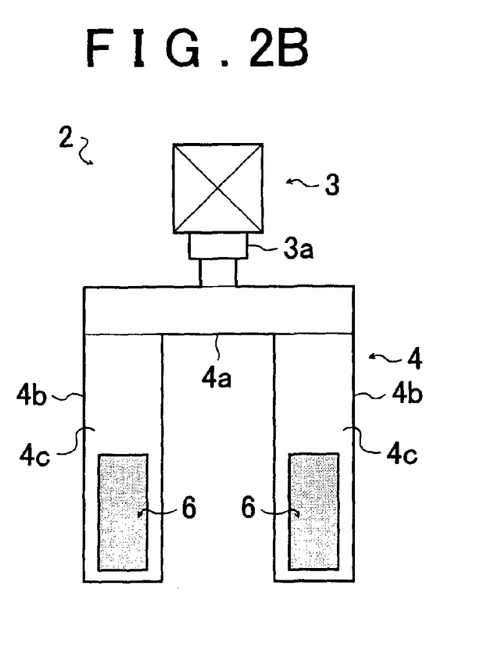
FIG. 2B is a sectional view taken along line IIB-IIB in FIG. 2A, of the grasping portion of the grasping apparatus having the contact portion bag body manufactured by the manufacturing method according to the example embodiments of the invention.

As shown in FIGS. 2A and 2B, the pawl portion 4 includes a support portion 4a and two clip portions 4b that protrude from the support portion 4a. The clip portions 4b are arranged a predetermined distance apart from one another. Also, the surface of the pawl portion 4 on the side where the contact portion 6 is attached serves as a surface 4c. The support portion 4a is fixed to the slider portion 3a. The control device 9 operates the driving portion 3 to slide the slider portion 3a such that the clip portions move in a reciprocating manner in the sliding direction of the slider portion 3a (see FIG. 1).

Figure 2C:
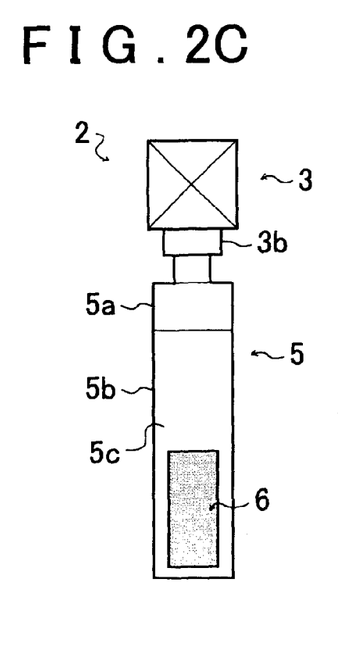
FIG. 2C is a sectional view taken along line IIC-IIC in FIG. 2A, of the grasping portion of the grasping apparatus having the contact portion bag body manufactured by the manufacturing method according to the example embodiments of the invention.

Also, as shown in FIGS. 2A and 2C, the pawl portion 5 includes a support portion 5a and one clip portion 5b that protrudes from the support portion 5a. Also, the surface of the pawl portion 5 on the side where the contact portion 6 is attached serves as a surface 5c. The support portion 5a is fixed to the slider portion 3b. The control device 9 operates the driving portion 3 to slide the slider portion 3b such that the clip portion 5b moves in a reciprocating manner in the sliding direction of the slider portion 3b (see FIG. 1).

Next, the structure of the contact portion 6 will be described. The pawl portions 4 and 5 are typically made of material of a predetermined hardness such as steel because it is necessary to ensure rigidity in order to achieve a predetermined clamping force. As a result, however, when the pawl portions 4 and 5 directly contact the workpiece, the pawl portions 4 and 5 may damage the workpiece. Also, workpieces are made in a variety of shapes, so the shape of the portions of the pawl portions 4 and 5 that contact the workpiece must conform to the shape of the workpiece in order to achieve a stable grasping state. Therefore, in the grasping portion 2, the contact portions 6 are attached to the portions of the clip portions 4b and the clip portion 5b (i.e., the surfaces 4c and 5c) that contact the workpiece.

Figure 3:
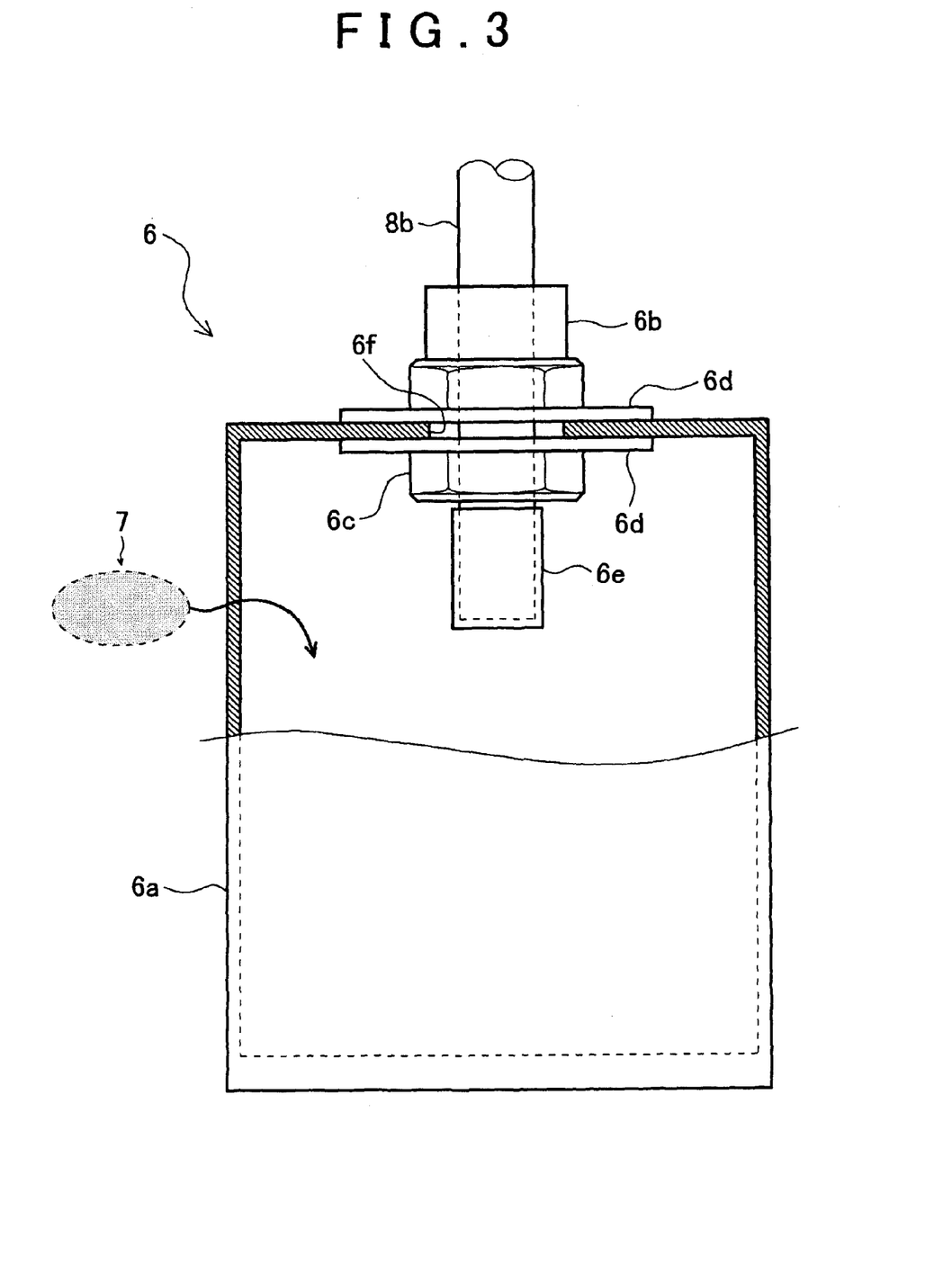
FIG. 3 is a view showing a frame format of the contact portion of the grasping apparatus having the contact portion bag body manufactured by a manufacturing method according to the example embodiments of the invention.

As described above, the contact portion 6 is a portion of the grasping apparatus 1 that directly contacts the workpiece, and is a portion that is able to take on two opposite forms, i.e., one in which the shape of the contact portion 6 is able to flexibly deform and another in which the shape of the contact portion 6 is firmly maintained, with a single member. This contact portion 6 includes a bag-shaped member 6a and a connecting port 6b and the like, as shown in FIG. 3. Also, a granular substance 7 is filled into the contact portion 6. The bag-shaped member 6a may be covered as appropriate by an outer bag, not shown, or the like in order to inhibit the bag-shaped member 6a from getting cut up.

The bag-shaped member 6a is a member that is made of nitrile butadiene rubber (NBR) that is elastic and airtight, in which a sheet of NBR is formed in a rectangular parallelepiped bag shape by appropriately vulcanize-bonding it (i.e., the sheet). Also, a hole portion 6f is formed in the bag-shaped member 6a, and the connecting port 6b that is a member for communicating the inside of the bag-shaped member 6a with the outside of the bag-shaped member 6a is arranged in the hole portion 6f.

The connecting port 6b is attached to the hole portion 6f while ensuring that the hole portion 6f is airtight by inserting seal members 6d and fastening them by screwing on nuts 6c. Also, a vacuum duct 8b is connected to the connecting port 6b, and a filter 6e is arranged at an end portion of the connecting port 6b that is inside the bag-shaped member 6a. Also, the filter 6e is configured to prevent the granular substance 7 from coming out of the connecting port 6b.

In this example embodiment, a case is described in which nitrile rubber (NBR) is used as the material of the bag-shaped member 6a. However, the material of which the bag-shaped member 6a is made is not limited to this. As long as the material is elastic and airtight, any of a variety of materials may be used according to conditions such as the operating environment and the like. Also, in this example embodiment, a case is described in which the shape of the bag-shaped member 6a is generally rectangular parallelepiped, but the shape of the bag-shaped member of the contact portion that forms the grasping apparatus of the invention is not limited to this.

The granular substance 7 is filled inside the contact portion 6 (i.e., more specifically, the bag-shaped member 6a). The bag-shaped member 6a and the granular substance 7 are hardened in a suitable shape in an integrated state by reducing the pressure inside the bag-shaped member 6a such that the grains that form the granular substance 7 are held tightly together.

The contact portion 6 preferably has properties such as 1) having good hardness when hardened, and 2) being lightweight, but the hardness of the contact portion 6 when hardened and the weight of the contact portion 6 change according to various changes in the specifications of the granular substance 7. Therefore, in the manufacturing method of the contact portion 6 according to the example embodiments of the invention, synthetic mullite that is able to be used as molding sand is used as the granular substance 7. Also, the property of the contact portion 6 can be adjusted to display the required functions of 1) and 2) above, by appropriately adjusting the grain diameter and filling volume and the like of the synthetic mullite that is used.

As shown in FIG. 1, the contact portion 6 (see FIGS. 2A, 2B, and 2C) is connected to the evacuation equipment 8 by vacuum ducts 8b, while being attached to the clip portions 4b and 5b of the pawl portions 4 and 5.

The evacuation equipment 8 is formed by means for making the contact portion 6 of the grasping apparatus 1 hard and soft, and includes a vacuum pump 8a, the vacuum ducts 8b, and an electromagnetic valve 8c and the like. In this example embodiment, the vacuum pump 8a is provided in the evacuation equipment 8, but a structure in which evacuating means other than the vacuum pump 8a (such as an ejector or the like) is provided is also possible. Further, in the grasping apparatus of the invention, the means for making the contact portion hard and soft is not necessarily limited to the evacuation equipment. That is, any of various modes capable of making the contact portion hard and soft may be employed.

When the inside of the bag-shaped portion 6a is reduced in pressure by operating the vacuum pump 8a, the contact portion 6 becomes hard due to the grains that make up the granular substance 7 that is filled inside the bag-shaped portion 6a being held together more tightly because of increasing the volume ratio of the granular substatnce 7 to the bag-shaped portion 6a. Therefore, at this time, the contact portion 6 takes on the form in which its shape is firmly maintained.

When this contact portion 6 is pressed, in a flexible state, against the workpiece by the clamping pressure of the pawl portions 4 and 5, the contact portion 6 is able to fit into concave portions and around convex portions on the surface of the workpiece, thus enabling the contact portion 6 to conform to the shape of the outer surface of the workpiece.

Also, the contact portion 6 is able to be made hard in a shape corresponding to (conforming to) the shape of the outer surface of the workpiece by activating the evacuation equipment 8 while the contact portion 6 is conformed to the shape of the outer surface of the workpiece. Therefore, a hard contact portion 6 that corresponds to the shape of the outer surface of the workpiece can be formed.

Figure 4A:
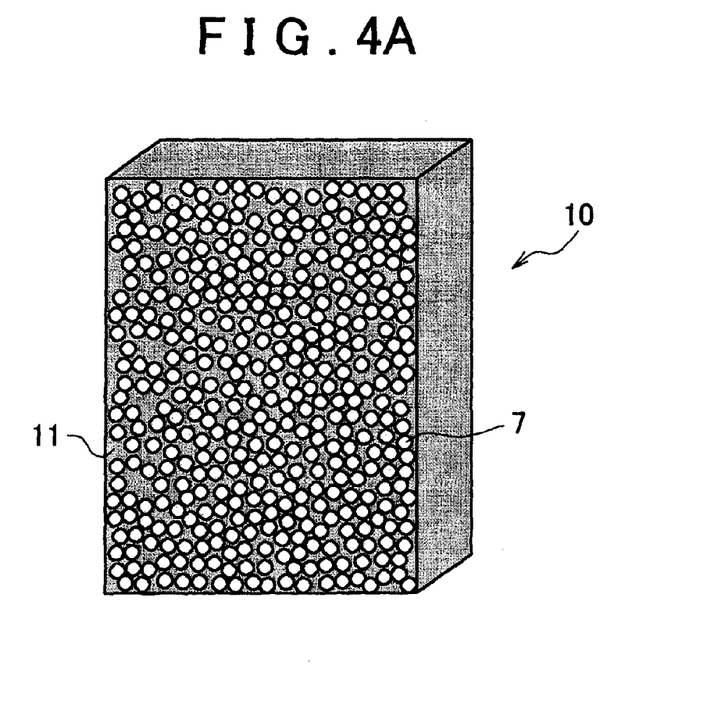
FIG. 4A is a diagrammatic perspective view showing a frame format of a core used in the manufacturing method of the contact portion bag body according to the example embodiments of the invention.
Figure 4B:
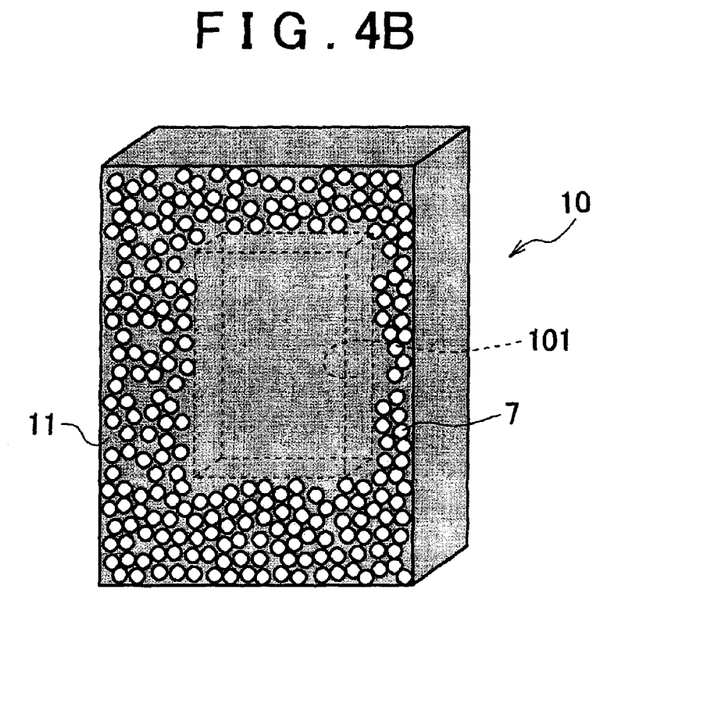
FIG. 4B is a diagrammatic perspective view showing a frame format of a core used in the manufacturing method of the contact portion bag body according to the example embodiments of the invention, when the core has a cavity.

Next, the manufacturing method of the contact portion 6 according to the example embodiments of the invention will be described with reference to FIGS. 4 to 12. With the manufacturing method of the contact portion 6 according to the example embodiments of the invention, the bag-shaped member 6a is manufactured using a core 10 as shown in FIG. 4. As shown in FIG. 4A, the core 10 is formed as a solid having a generally rectangular parallelepiped shape, in which the granular substance 7 that is an aggregate of a plurality of grains is bound together by a binder 11. The shape of the core 10 used in the manufacturing method of the contact portion 6 according to the example embodiments of the invention is not limited to a generally rectangular parallelepiped shape. That is, the shape of the core 10 may also be such that the corner portions are R-shaped or chamfered portions are provided, for example, corresponding to the desired shape of the bag-shaped member 6a.

In this way, the core 10 is formed in a generally rectangular parallelepiped shape by hardening the granular substance 7 with the binder 11. However, when determining the shape and size of the core 10, the content volume necessary for the bag-shaped member 6a is ensured, and the amount of granular substance 7 that needs to be filled with respect to the content volume is ensured, taking the function of the contact portion 6 into account.

Figure 5A:
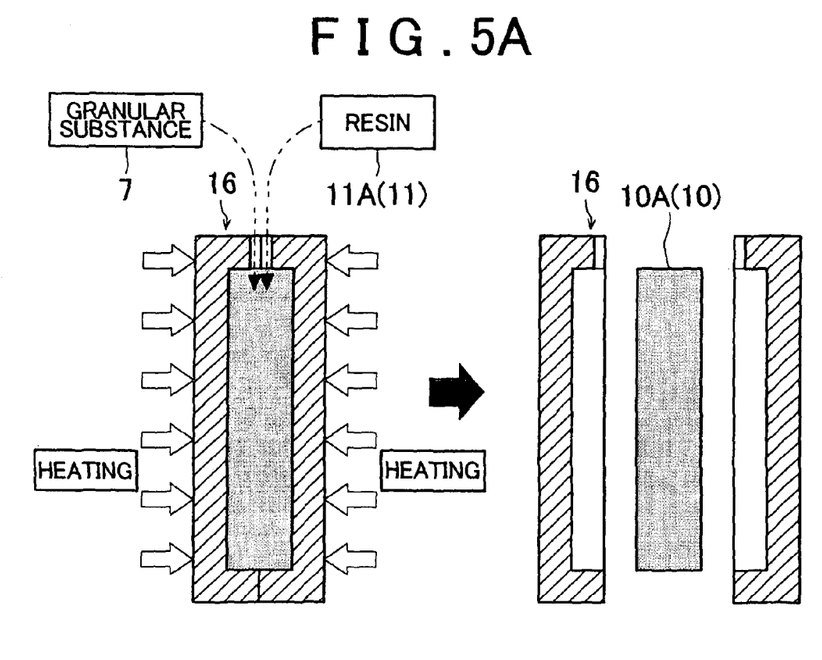
FIG. 5A is a view showing a frame format of a manufacturing method of the core using resin according to a first example embodiment of the invention.

Here, the method of preparing the core 10 will be described in even greater detail. First, the method of preparing a first core 10A that is the core 10 according to a first example embodiment of the invention will be described. As shown in FIG. 5A, the first core 10A is prepared by hardening the granular substance 7 that is the member to be filled into the bag-shaped member 6a of the contact portion 6, with resin 11A as a first binder 11. The resin 11A is material made of phenol resin or the like that is typically used for hardening molding sand, when manufacturing a core used in molding. Then the granular substance 7 and the resin 11A are mixed together and the mixture is put into a mold 16. The first core 10A of the desired shape is then prepared by softening the resin 11A in this state by heating the mold 16 to bond the grains of the granular substance 7 together.

The outer dimensions of the core 10 are able to be adjusted by forming a cavity 101 inside of it, as shown in FIG. 4B, for example. Also, the content volume of the bag-shaped member 6a is able to be adjusted by adjusting the outer dimensions of the core 10. Then the ratio of the amount of granular substance 7 in the core 10 to the content volume of the bag-shaped member 6a is able to be adjusted by adjusting the content volume of the bag-shaped member 6a in this way. For example, one possible method for forming this kind of cavity 101 involves preparing the core 10 with the granular substance 7 wrapped around a body having a predetermined volume made with dry ice or the like.

Figure 5B:
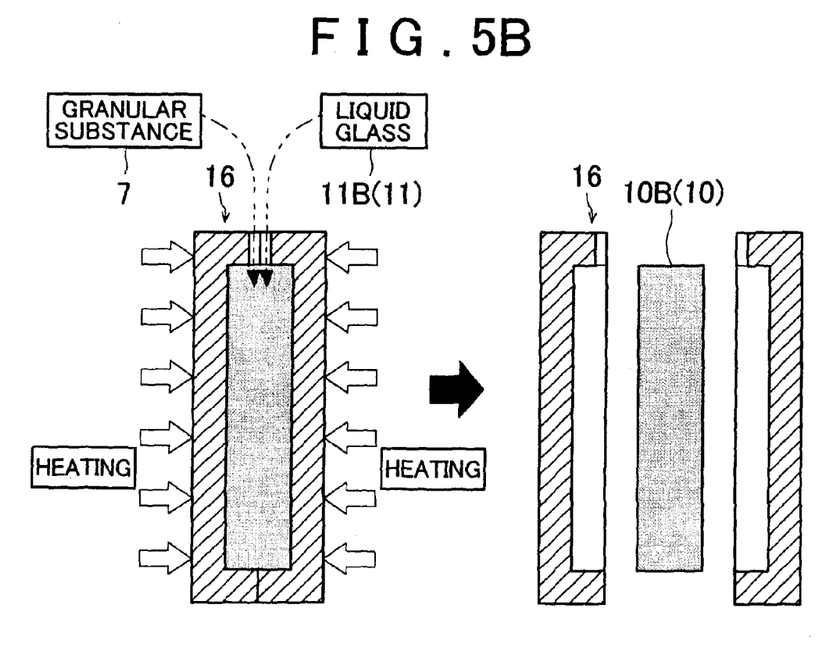
FIG. 5B is a view showing a frame format of a manufacturing method of the core using liquid glass according to a second example embodiment of the invention.

Next, a method for preparing a second core 10B that is the core 10 according to a second example embodiment of the invention will be described. As shown in FIG. 5B, the second core 10B is prepared by hardening a granular substance 7 that is a member to be filled into the bag-shaped member 6a of the contact portion 6 with liquid glass 11B as a second binder 11. The liquid glass 11B is a member formed from sodium silicate or the like that is typically used to harden molding sand when manufacturing a core used in molding. Then the granular substance 7 and the liquid glass 11B are mixed together and the mixture is put into the mold 16. The second core 10B of the desired shape is then prepared by softening the liquid glass 11B in this state by heating the mold 16 to bond the grains of the granular substance 7 together.

Figure 6A:
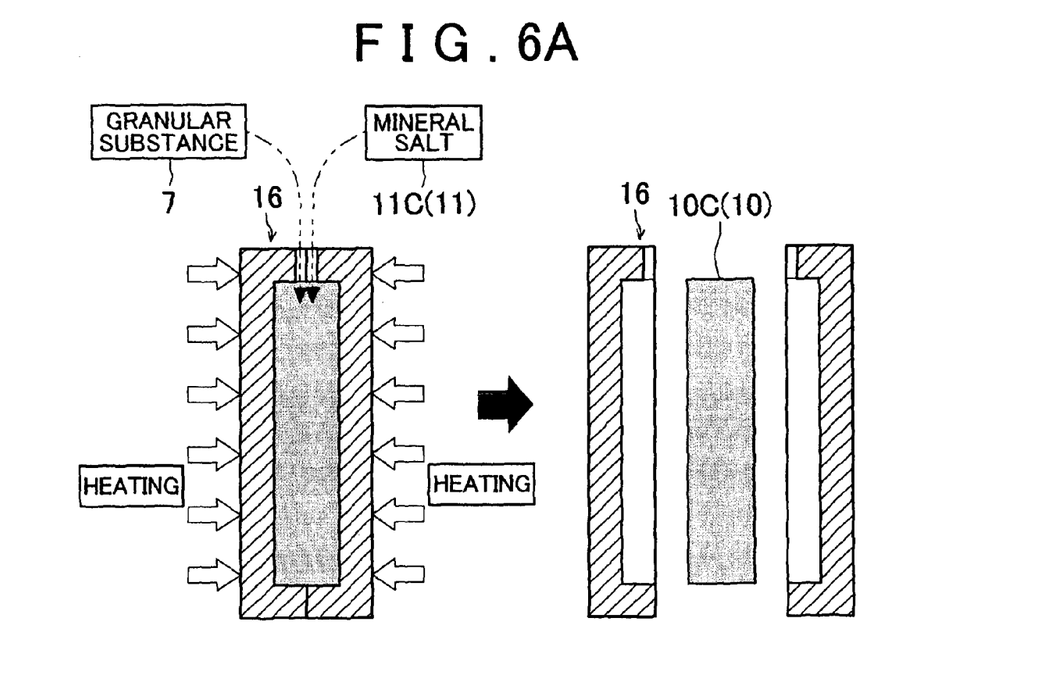
FIG. 6A is a view showing a frame format of a manufacturing method of the core using mineral salt according to a third example embodiment of the invention.

Next, a method for preparing a third core 10C that is the core 10 according to a third example embodiment of the invention will be described. As shown in FIG. 6A, the third core IOC is prepared by hardening the granular substance 7 that is a member to be filled into the bag-shaped member 6a of the contact portion 6 with mineral salt 11C as a third binder 11. The mineral salt 11C is a member formed from silicate of soda or the like that is typically used to harden molding sand when manufacturing a core used in molding. Then the granular substance 7 and the mineral salt 11C are mixed together and the mixture is put into the mold 16. The third core 10C of the desired shape is then prepared by softening the mineral salt 11C in this state by heating the mold 16 to bond the grains of the granular substance 7 together.

Figure 6B:
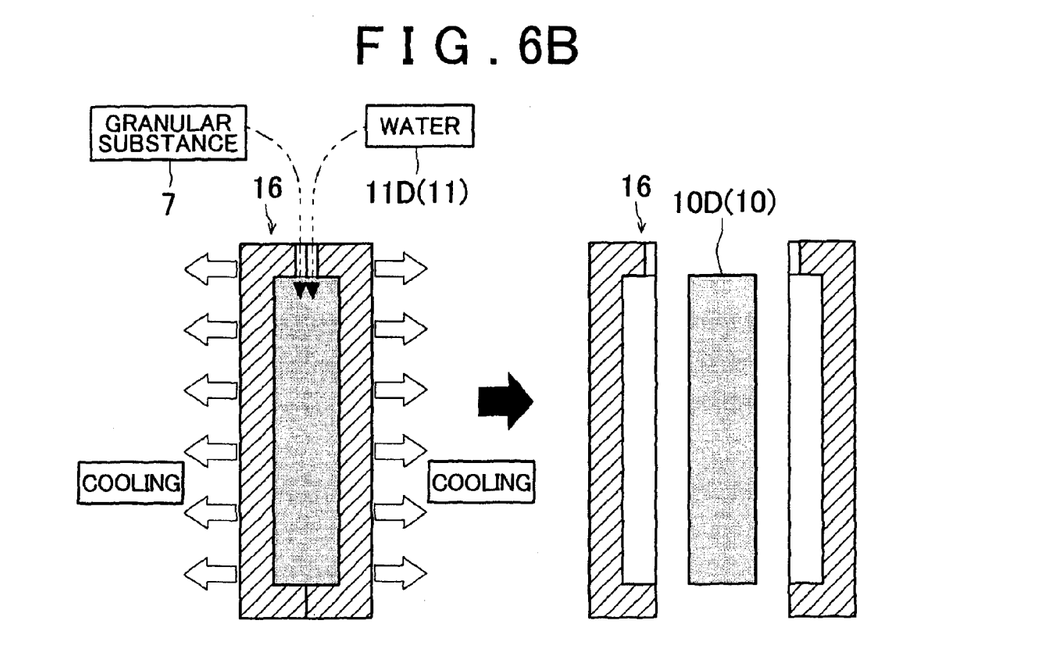
FIG. 6B is a view showing a frame format of a manufacturing method of the core using water according to a fourth example embodiment of the invention.

Next, a method for preparing a fourth core 10D that is the core 10 according to a fourth example embodiment of the invention will be described. As shown in FIG. 6B, the fourth core 10D is prepared by hardening the granular substance 7 that is a member to be filled into the bag-shaped member 6a of the contact portion 6 with water 11D that is a liquid as a fourth binder 11. In this case, the granular substance 7 and the water 11D are mixed together and the mixture is put into the mold 16. The fourth core 10D of the desired shape is then prepared by cooling the mold 16 in this state to solidify (i.e., freeze) the water 11D (forming ice). In this example embodiment, a case is described in which the water 11D is used as the fourth binder 11 that is a liquid. However, the liquid need only have a property that enables it to solidify (i.e., freeze) and dissolve (i.e., melt) in a predetermined temperature range. The liquid employed as the fourth binder 11 is not limited to the water 11D.

Figure 7:
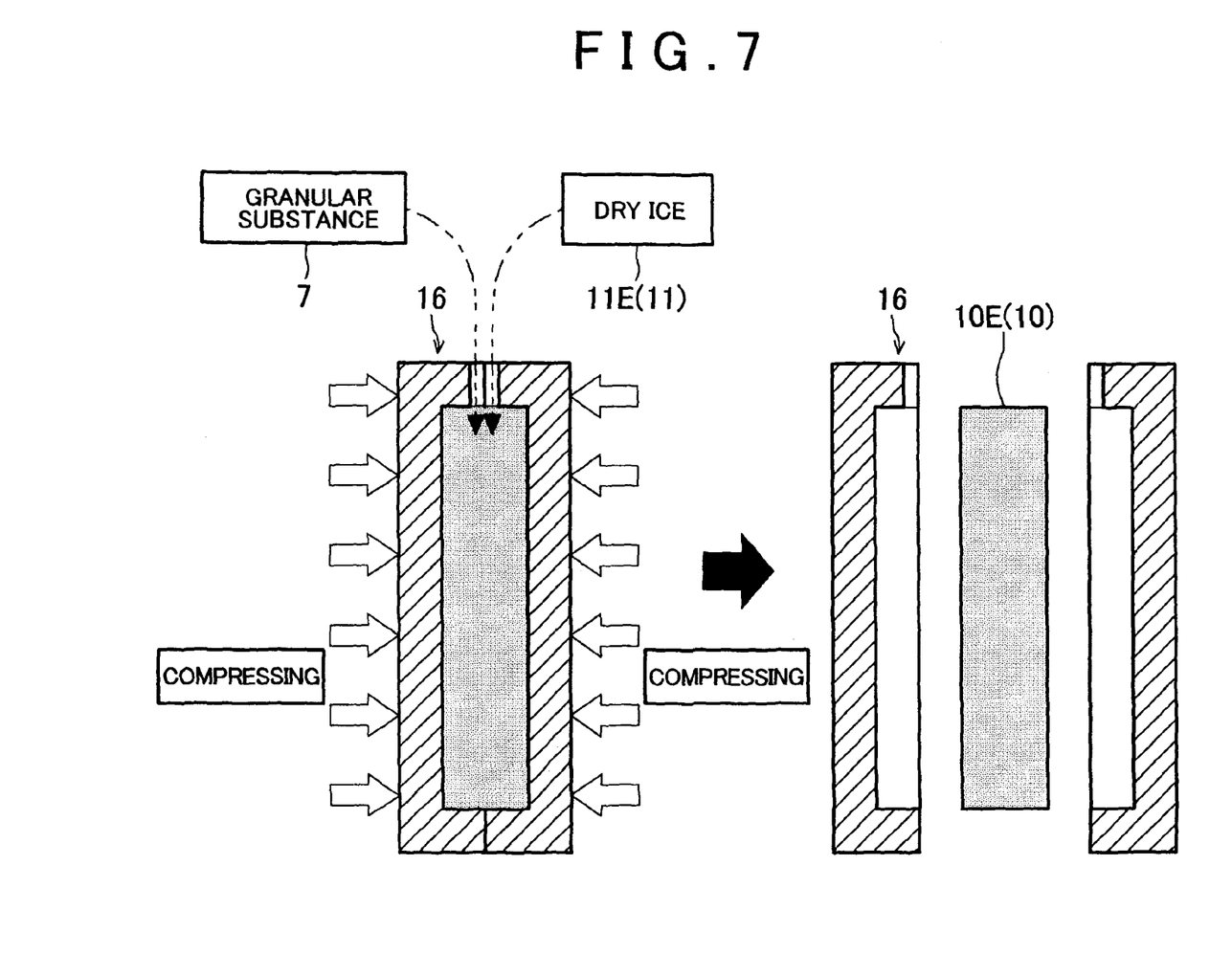
FIG. 7 is a view showing a frame format of a manufacturing method of the core using dry ice according to a fifth example embodiment of the invention.

Next, a method for preparing a fifth core 10E that is the core 10 according to a fifth example embodiment of the invention will be described. As shown in FIG. 7, a fifth core 10E is prepared by hardening the granular substance 7 that is a member to be filled into the bag-shaped member 6a of the contact portion 6 with dry ice 11E that is a solid that has a predetermined volume, and that sublimes as a fifth binder 11. In this case, the granular substance 7 and the dry ice 11E are mixed together and the mixture is put into the mold 16. The fifth core 10E of the desired shape is then prepared by hardening the granular substance 7 with the dry ice 11E, by compressing the mold 16 in this state. In this example embodiment, a case is described in which the dry ice 11E is used as the fifth binder 11 that is a solid that has a predetermined volume, and that sublimes without liquefying. However, the solid need only be able to sublime in a predetermined temperature range. The solid employed as the fifth binder 11 is not limited to the dry ice 11E.

Also, in this example embodiment, the cores 10A to 10E according to the first to the fifth example embodiments are given as examples, but the material of the core 10 used in the manufacturing method of the contact portion 6 according to the example embodiments of the invention are not limited to these. That is, as long as the material is able to harden into a solid by binding the granular substance 7, and is able to be broken up easily, other various materials may also be used.

Next, a manufacturing method of the contact portion 6 using the core 10 will be described. First, a manufacturing method of the contact portion 6 according to one example embodiment of the invention will be described. In the manufacturing method of the contact portion 6 according to one example embodiment of the invention, the bag-shaped member 6a is manufactured according to a so-called injection molding method using the cores 10A to 10E according to the example embodiments described thus far.

Figure 8:
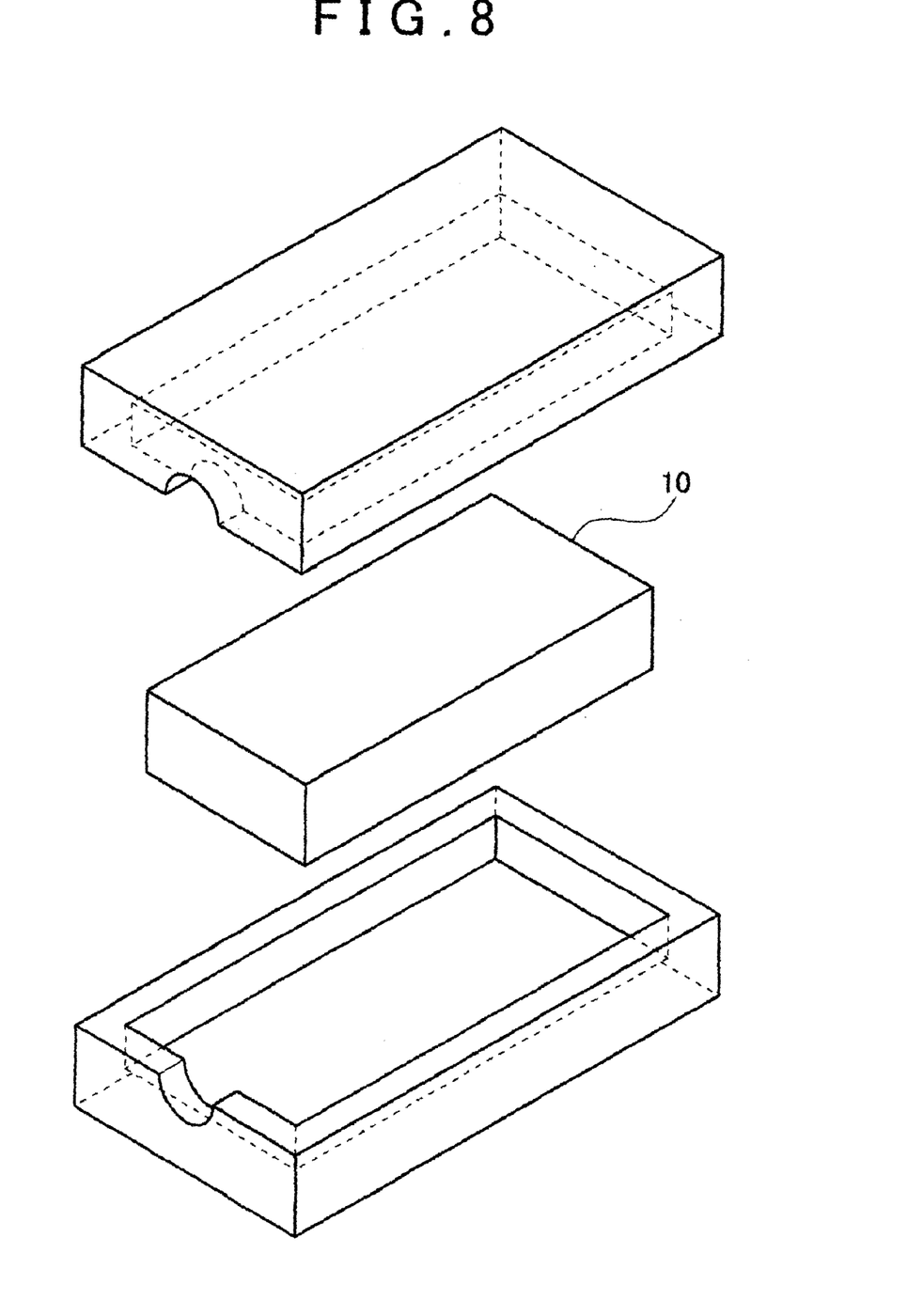
FIG. 8 is an exploded perspective view showing a frame format of an arrangement of the core with respect to a mold in the manufacturing method of the contact portion according to one example embodiment of the invention.
Figure 9:
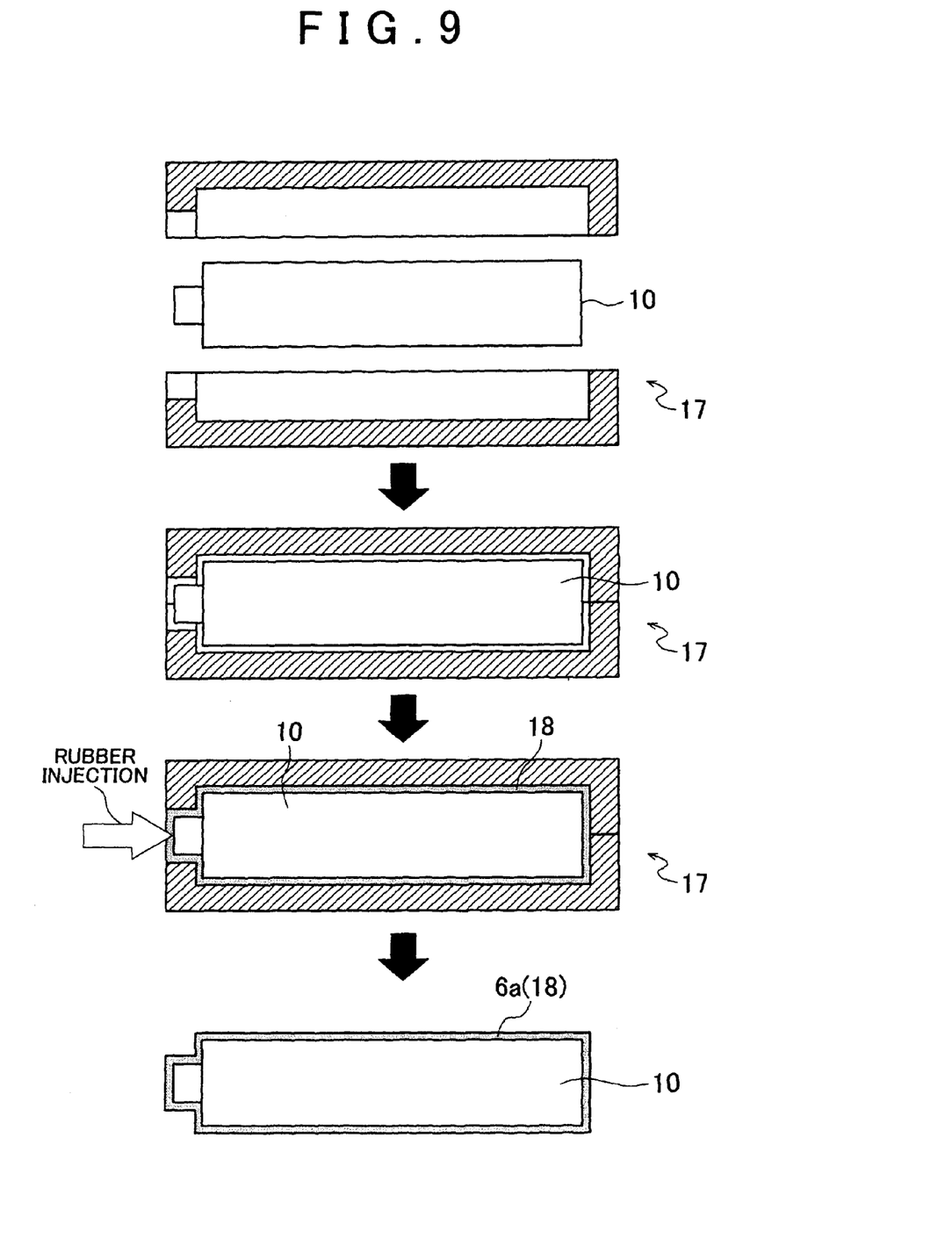
FIG. 9 is a view showing a frame format of the manufacturing method of the contact portion (when injection molding the contact portion) according to the one example embodiment of the invention.

First, the core 10 is arranged in a mold 17 as shown in FIGS. 8 and 9. At this time, a suitable spacer or the like is interposed between the core 10 and the is mold 17 to ensure a predetermined gap around the core 10 in the mold 17, as shown in FIG. 9. Then when rubber 18 that is liquid raw material is injected into the mold 17, a coating of the rubber 18 that is elastic and airtight is formed around the core 10, and this coating becomes the bag-shaped member 6a.

Figure 10A:
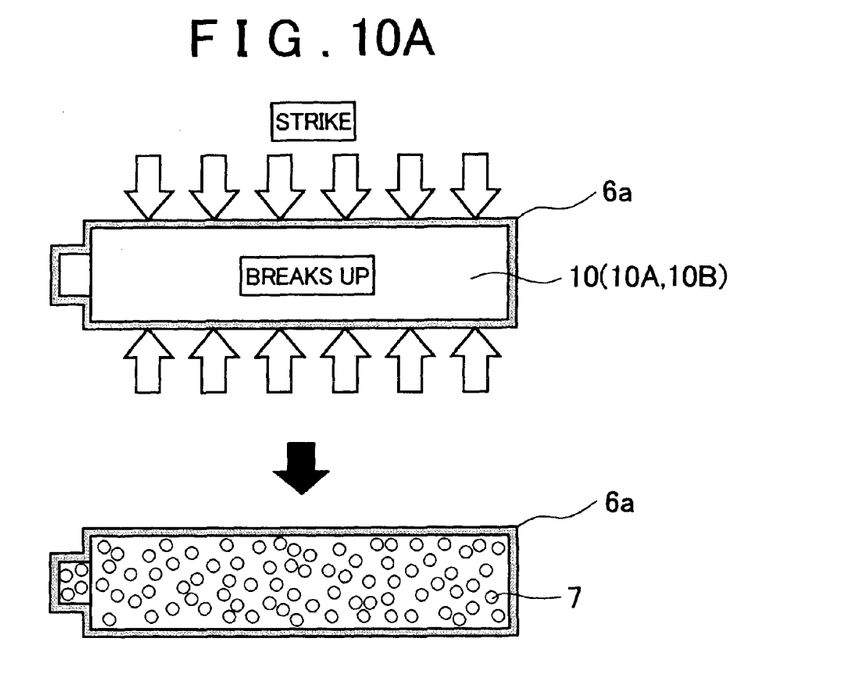
FIG. 10A is a view showing a frame format of a case in which the core is pulverized by striking, in a manufacturing method of the contact portion (a step of breaking up the core) according to the example embodiments of the invention.

Next in the manufacturing method of the contact portion 6 according to one example embodiment of the invention, the process shifts to a step of breaking up the core 10. For example, as shown in FIG. 10A, when the core 10 is the first core 10A or the second core 10B, the core 10 is able to be broken up by striking the bag-shaped member 6a that is wrapped around the core 10, from the outside. Breaking up the core 10 enables the granular substance 7 that forms the core 10 to be returned to a state in which the grains flow independently again.

According to this kind of structure, instead of performing work of filling the granular substance 7 into the bag-shaped member 6a, the granular substance 7 can easily be placed in the state that it would have been in if it was filled into the bag-shaped member 6a by simply striking the bag-shaped member 6a. After this, the contact portion 6 can easily be formed simply by forming an opening in the bag-shaped member 6a or assembling the necessary members such as the connecting port 6b to the bag-shaped member 6a.

Figure 10B:
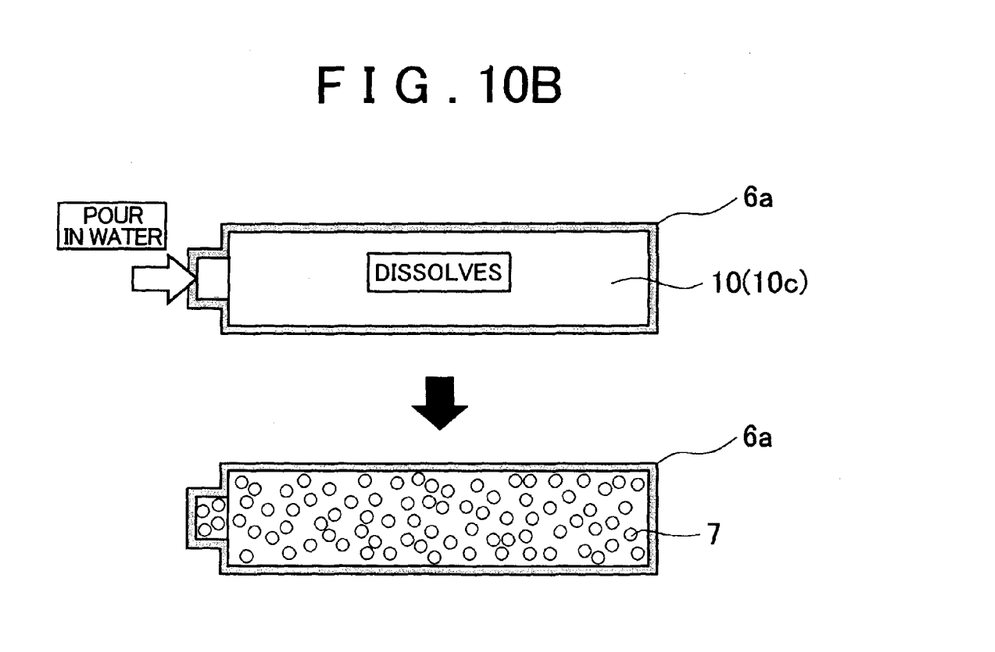
FIG. 10B is a view showing a frame format of a case in which a binder is dissolved by pouring in water, in a manufacturing method of the contact portion (a step of breaking up the core) according to the example embodiments of the invention.

Also, for example, as shown in FIG. 10B, when the core 10 is the third core 10C, the core 10 can be broken up by pouring water into the bag-shaped member 6a that is wrapped around the core 10. Then, the granular substance 7 that forms the core 10 can be returned to the state in which the grains are able to flow independently again, by breaking up the core 10 and drying the inside of the bag-shaped member 6a.

That is, in the manufacturing method of the contact portion 6 according to the example embodiments of the invention, the step of preparing the core 10 is performed by molding the mixture that includes the granular substance 7 and the binder 11 (i.e., the first to the third binders 11A, 11B, and 11C) into a predetermined shape by heating the mixture inside the mold 16. This kind of structure makes it possible to easily manufacture the core 10 that is a core for forming the bag-shaped member 6a, and that includes the granular substance 7 (i.e., the first to the third cores 10A, 10B, and 10C).

Also, in the manufacturing method of the contact portion 6 according to the example embodiments of the invention, the step of breaking up the core 10 (i.e., the first and second cores 10A and 10B) is performed by pulverizing the cores 10A and 10B inside the bag-shaped member 6a by applying external force to the bag-shaped member 6a. This kind of structure makes it possible to easily break up the core 10 (i.e., the first and second cores 10A and 10B) inside the bag-shaped member 6a. As a result, the granular substance 7 is able to be easily granularized inside the bag-shaped member 6a.

Also, in the manufacturing method of the contact portion 6 according to the example embodiments of the invention, the step of breaking up the core 10 (i.e., the third core 10C) is performed by dissolving the mineral salt 11C that is the third binder 11 that forms the third core IOC inside the bag-shaped member 6a, by pouring water into the bag-shaped member 6a. This kind of structure makes it possible to easily break up the core 10 (i.e., the third core 10C) inside the bag-shaped member 6a. As a result, the granular substance 7 is able to be easily granularized inside the bag-shaped member 6a.

Figure 11A:
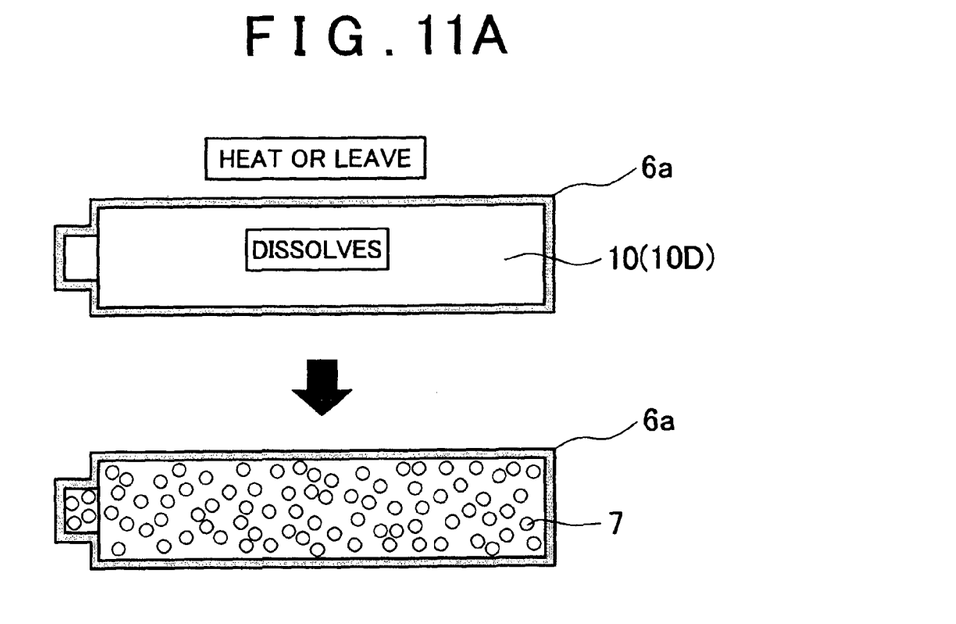
FIG. 11A is a view showing a frame format of a case in which a binder is dissolved by being heated or left, in a manufacturing method of the contact portion (a step of breaking up the core) according to the example embodiments of the invention.

Alternately, for example, when the core 10 is the fourth core 10D, as shown in FIG. 11A, the core 10 is able to be broken up by heating the bag-shaped member 6a that is wrapped around the core 10, or by leaving this bag-shaped member 6a at normal temperature, for example. Also, the granular substance 7 that forms the core 10 is able to be returned to the state in which the grains are able to flow independently again, by breaking up the core 10 and drying the inside of the bag-shaped member 6a.

That is, in the manufacturing method of the contact portion 6 according to the example embodiments of the invention, the step of preparing the core 10 is performed by molding the mixture that includes the granular substance 7 and the liquid (the water 11D in this example embodiment) into a predetermined shape by solidifying (i.e., freezing) the water 11D, which is accomplished by cooling the mixture inside the mold 16. This kind of structure makes it possible to easily manufacture the core 10 that is a core for forming the bag-shaped member 6a, and that includes the granular substance 7 (i.e., the fourth core 10D).

That is, in the manufacturing method of the contact portion 6 according to the example embodiments of the invention, the step of breaking up the core 10 is performed by dissolving (i.e., melting) a solidified (i.e., frozen) liquid that is the fourth binder 11 that forms the fourth core 10D inside the bag-shaped member 6a (the frozen water 11D (i.e., ice) in this example embodiment), by heating the bag-shaped member 6a or leaving the bag-shaped member 6a. This kind of structure makes it possible to easily break up the core 10 (i.e., the fourth core 10D) inside the bag-shaped member 6a. As a result, the granular substance 7 is able to be easily granularized inside the bag-shaped member 6a.

Figure 11B:
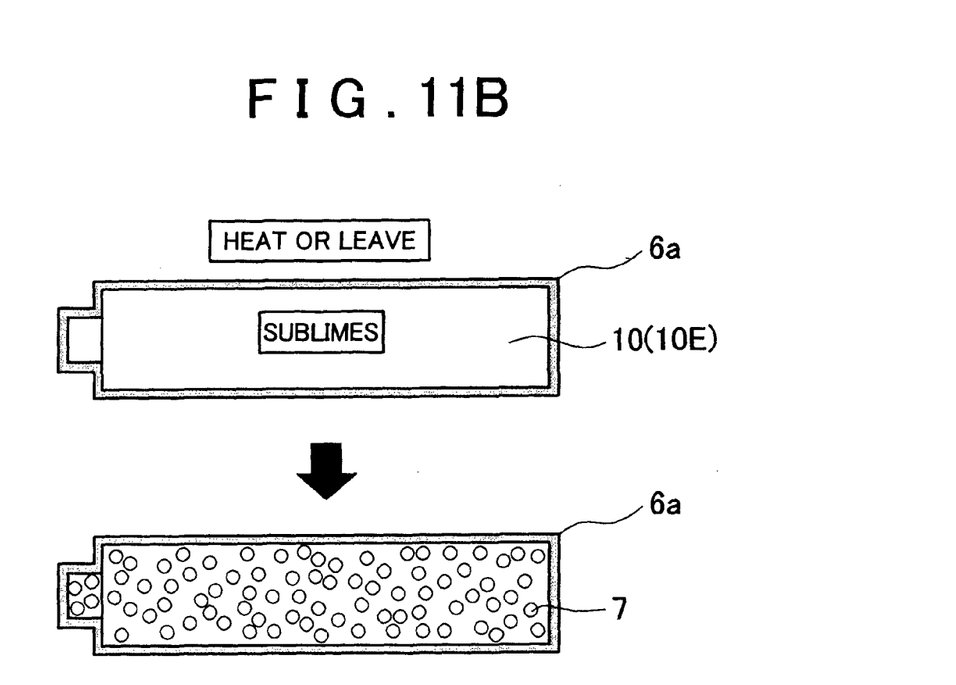
FIG. 11B is a view showing a frame format of a case in which a binder is sublimed by being heated or left, in a manufacturing method of the contact portion (a step of breaking up the core) according to the example embodiments of the invention.

Furthermore, when the core 10 is the fifth core 10E, as shown in FIG. 11B, for example, the core 10 is able to be broken up by heating the bag-shaped member 6a that is wrapped around the core 10, or by leaving this bag-shaped member 6a at normal temperature, for example. Also, the granular substance 7 that forms the core 10 is able to be returned to the state in which the grains are able to flow independently again, by breaking up the core 10.

That is, in the manufacturing method of the contact portion 6 according to the example embodiments of the invention, the step of preparing the core 10 is performed by molding the mixture that includes the granular substance 7 and the solid (the dry ice 11E in this example embodiment) that has a predetermined volume, and that sublimes without liquefying as the binder 11 into a predetermined shape, which is accomplished by compressing this mixture inside the mold 16. This kind of structure makes it possible to easily manufacture the core 10 that is a core for forming the bag-shaped member 6a, and that includes the granular substance 7 (i.e., the fifth core 10E).

Also, in the manufacturing method of the contact portion 6 according to the example embodiments of the invention, the step of breaking up the core 10 is performed by subliming a solid (the dry ice 11E in this example embodiment) having a predetermined volume as the binder 11 that forms the core 10 inside the bag-shaped member 6a, which is accomplished by heating the bag-shaped member 6a or leaving the bag-shaped member 6a. This kind of structure makes it possible to easily break up the core 10 (i.e., the fifth core 10E) inside the bag-shaped member 6a. As a result, the granular substance 7 is able to be easily granularized inside the bag-shaped member 6a.

Figure 12:
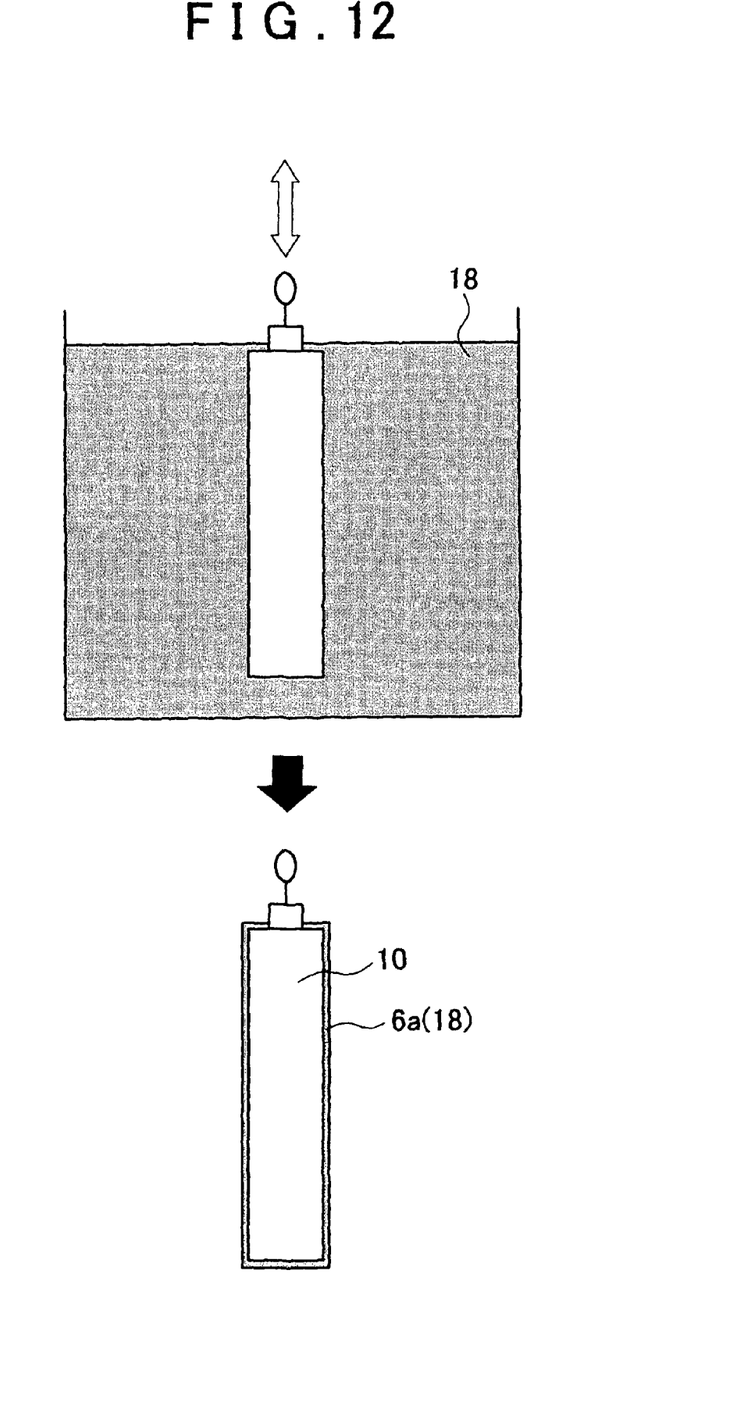
FIG. 12 is a view showing a frame format of the manufacturing method of the contact portion bag body (when dip molding the contact portion bag body) according to another example embodiment of the invention.

Next, the manufacturing method of the contact portion 6 according to another example embodiment of the invention will be described. In the manufacturing method of the bag-shaped member 6a according to this example embodiment of the invention, the bag-shaped member 6a is manufactured by a so-called dip (dunk) molding method using the cores 10A to 10E according to the example embodiments described thus far. As shown in FIG. 12, when the core 10 that is the core is dipped into the rubber 18 that is the liquid raw material, a covering made of the rubber 18 that is elastic and airtight is able to be formed around the core 10, and this covering becomes the bag-shaped member 6a.

Also, in the manufacturing method of the contact portion 6 according to this other example embodiment of the invention, just as in the manufacturing method of the contact portion 6 according to the previous example embodiment of the invention, the process then shifts to a step of breaking up of the core 10. For the step of breaking up the core 10, the same step as the step in the manufacturing method of the contact portion 6 according to the previous example embodiment of the invention may be employed.

In this way, in the manufacturing method of the contact portion 6 according to the example embodiments of the invention, first the core 10 that is a structure that includes the granular substance 7 is prepared by a method such as that described above, and then the bag-shaped member 6a is manufactured using the prepared core 10 as the core. Moreover, in the manufacturing method of the contact portion 6 according to the example embodiments of the invention, in the bag-shaped member 6a in which the core 10 is the core, the granular substance 7 is easily granularized in the bag-shaped member 6a by breaking up the core 10 inside the bag-shaped member 6a.

That is, the manufacturing method of a contact portion according to the example embodiments is a manufacturing method of the contact portion 6 that includes the rubber bag-shaped member 6a that is made of material (rubber 18 in this example embodiment) that is elastic and airtight, and the granular substance 7 that is filled inside of the bag-shaped member 6a, and that is a member for forming a portion of the grasping apparatus 1 that contacts a workpiece. This manufacturing method includes a step of preparing the core 10 that is a core for forming the bag-shaped member 6a, by hardening the granular substance 7 with the binder 11, a step of forming the bag-shaped member 6a by forming a covering made of the rubber 18 that is material that is elastic and airtight around the core 10, and a step of breaking up the core 10 inside the bag-shaped member 6a. This kind of structure makes it easy to manufacture the contact portion 6 without providing another step for filling the granular substance 7 into the bag-shaped member 6a.

In these example embodiments, the one example embodiment according to injection molding and the other example embodiment according to dip molding are described. However, the manufacturing method of the bag-shaped member 6a is not limited to the manufacturing methods of the contact portion 6 according to these example embodiments of the invention. That is, any of a variety of manufacturing methods of the bag-shaped member 6a may be employed as long as the method is one that enables a covering made of material that is elastic and airtight (such as the rubber 18 or synthetic resin, for example) to be formed around the core 10.

The invention claimed is:

1. A manufacturing method of a contact portion of a grasping apparatus, said contact portion being able to take on a form in which its shape can flexibly deform and another form in which its shape is firmly maintained, and comprising a bag body that has a bag-shaped member made of an elastic and airtight material and a connecting port, and a granular substance filled inside of the bag-shaped member, wherein the contact portion takes on the form in which its shape is firmly maintained when a volume ratio of the granular substance to the bag-shaped member is increased by reducing a pressure within the bag-shaped member; the manufacturing method comprising:
   a step of preparing a core for forming the bag-shaped member, by hardening the granular substance;
   a step of forming the bag-shaped member by forming a covering made of the elastic and airtight material around the core; and
   a step of breaking up the core that is inside of the bag-shaped member.

2. The manufacturing method according to claim 1, wherein the step of preparing the core is performed by molding a mixture that includes the granular substance and a solid that has a predetermined volume, and that sublimes as a binder into a predetermined shape by compressing the mixture inside of a mold.

3. The manufacturing method according to claim 2, wherein the step of breaking up the core is performed by subliming the solid having the predetermined volume that forms the core that is inside of the bag-shaped member, by heating the bag-shaped member or leaving the bag-shaped member.

4. The manufacturing method according to claim 1, wherein the step of preparing the core is performed by molding a mixture that includes the granular substance and a binder into a predetermined shape by heating the mixture inside of a mold.

5. The manufacturing method according to claim 4, wherein the step of breaking up the core is performed by pulverizing the core that is inside of the bag-shaped member, by applying external force to the bag-shaped member.

6. The manufacturing method according to claim 4, wherein the step of breaking up the core is performed by dissolving the binder that forms the core that is inside of the bag-shaped member, by pouring water into the bag-shaped member.

7. The manufacturing method according to claim 1, wherein the step of preparing
   the core is performed by molding a mixture that includes the granular substance and a liquid as a binder into a predetermined shape by solidifying the liquid by cooling the mixture inside of a mold.

8. The manufacturing method according to claim 7, wherein the step of breaking up the core is performed by dissolving the solidified liquid that forms the core that is inside of the bag-shaped member, by heating the bag-shaped member or leaving the bag-shaped member.

9. A manufacturing method of a grasping apparatus, wherein a contact portion is manufactured according to the manufacturing method of claim 1, and attached to a pawl portion of said grasping apparatus, and a vacuum duct is connected to the connecting port.

* * * * *